United States Patent
Chen et al.

(10) Patent No.: US 9,536,338 B2
(45) Date of Patent: Jan. 3, 2017

(54) ANIMATING OBJECTS USING THE HUMAN BODY

(75) Inventors: Jiawen Chen, Cambridge (GB); Shahram Izadi, Cambridge (GB); Andrew William Fitzgibbon, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 1073 days.

(21) Appl. No.: 13/563,313

(22) Filed: Jul. 31, 2012

(65) Prior Publication Data
US 2014/0035901 A1   Feb. 6, 2014

(51) Int. Cl.
G06T 13/00   (2011.01)
G06T 13/40   (2011.01)
G06T 1/20    (2006.01)
G06T 13/80   (2011.01)
A63F 13/40   (2014.01)

(52) U.S. Cl.
CPC .......... G06T 13/40 (2013.01); *A63F 13/10* (2013.01); *G06T 1/20* (2013.01); *G06T 13/00* (2013.01); *G06T 13/80* (2013.01)

(58) Field of Classification Search
CPC ........ G06T 19/006; G06T 15/08; G06T 13/40; G06T 13/00; G06T 13/80; G06T 13/20; H04L 63/0428; H04L 63/08; H04L 2463/102; G06Q 20/20; G06Q 20/202; G06Q 20/32; G06Q 20/322; G06F 3/017; G06F 21/10; G06F 3/04883; G06F 3/011; A63F 13/12; A63F 13/00; A63F 13/10

USPC ........ 345/473, 440, 420, 474.419, 672, 643, 345/649
See application file for complete search history.

(56) References Cited

U.S. PATENT DOCUMENTS 6,167,390 A * 12/2000 Brady ................. G06K 9/6272
                                                    706/18
6,606,095 B1 * 8/2003 Lengyel et al. .............. 345/473
6,888,549 B2 * 5/2005 Bregler et al. ............... 345/474
7,123,263 B2 * 10/2006 Harvill ......................... 345/473
(Continued)

OTHER PUBLICATIONS

Katsu Yamane, Animating Non-Humanoid Characters with Human Motion Data, The Eurographic Association 2010.*
(Continued)

*Primary Examiner* — Abderrahim Merouan
(74) *Attorney, Agent, or Firm* — Tom Wong; Micky Minhas; Zete Law, P.L.L.C.

(57) ABSTRACT

Methods of animating objects using the human body are described. In an embodiment, a deformation graph is generated from a mesh which describes the object. Tracked skeleton data is received which is generated from sensor data and the tracked skeleton is then embedded in the graph. Subsequent motion which is captured by the sensor result in motion of the tracked skeleton and this motion is used to define transformations on the deformation graph. The transformations are then applied to the mesh to generate an animation of the object which corresponds to the captured motion. In various examples, the mesh is generated by scanning an object and the deformation graph is generated using orientation-aware sampling such that nodes can be placed close together within the deformation graph where there are sharp corners or other features with high curvature in the object.

20 Claims, 10 Drawing Sheets

(56) References Cited

U.S. PATENT DOCUMENTS

| | | | | |
|---|---|---|---|---|
| 7,712,018 | B2* | 5/2010 | Brown | G06F 17/214 715/204 |
| 8,797,328 | B2* | 8/2014 | Corazza et al. | 345/473 |
| 2003/0164829 | A1* | 9/2003 | Bregler et al. | 345/474 |
| 2004/0017947 | A1* | 1/2004 | Yang | 382/224 |
| 2004/0021660 | A1* | 2/2004 | Ng-Thow-Hing et al. | 345/419 |
| 2004/0101191 | A1* | 5/2004 | Seul et al. | 382/151 |
| 2004/0119716 | A1* | 6/2004 | Park et al. | 345/473 |
| 2005/0243089 | A1* | 11/2005 | Johnston | G06T 15/50 345/426 |
| 2006/0058592 | A1* | 3/2006 | Bouma et al. | 600/301 |
| 2006/0290693 | A1* | 12/2006 | Zhou et al. | 345/420 |
| 2007/0091178 | A1* | 4/2007 | Cotter et al. | 348/159 |
| 2007/0136664 | A1* | 6/2007 | Brown | G06F 17/214 715/236 |
| 2007/0203908 | A1* | 8/2007 | Wang et al. | 707/7 |
| 2008/0031512 | A1* | 2/2008 | Mundermann et al. | 382/154 |
| 2008/0129825 | A1* | 6/2008 | DeAngelis | A63B 24/0021 348/169 |
| 2008/0180448 | A1 | 7/2008 | Anguelov et al. | |
| 2008/0215510 | A1* | 9/2008 | Regli et al. | 706/12 |
| 2008/0304422 | A1* | 12/2008 | Bejerano et al. | 370/252 |
| 2009/0002376 | A1* | 1/2009 | Xu et al. | 345/473 |
| 2009/0086020 | A1* | 4/2009 | Westrick | G01C 7/04 348/140 |
| 2009/0087122 | A1* | 4/2009 | Xu et al. | 382/277 |
| 2009/0102843 | A1* | 4/2009 | Sloan | G06T 15/503 345/426 |
| 2009/0213143 | A1* | 8/2009 | Igarashi | 345/643 |
| 2009/0232353 | A1* | 9/2009 | Sundaresan et al. | 382/103 |
| 2010/0033488 | A1 | 2/2010 | Zhou et al. | |
| 2010/0134490 | A1 | 6/2010 | Corazza et al. | |
| 2010/0149179 | A1* | 6/2010 | de Aguiar et al. | 345/420 |
| 2010/0149917 | A1* | 6/2010 | Imhof et al. | 367/53 |
| 2010/0157340 | A1* | 6/2010 | Chen et al. | 358/1.9 |
| 2010/0332210 | A1* | 12/2010 | Birdwell et al. | 703/22 |
| 2011/0142308 | A1* | 6/2011 | Ishikawa et al. | 382/128 |
| 2011/0166821 | A1* | 7/2011 | Kim | 702/141 |
| 2011/0173204 | A1* | 7/2011 | Murillo | A63F 13/06 707/741 |
| 2011/0181422 | A1* | 7/2011 | Tran | 340/573.1 |
| 2011/0181601 | A1* | 7/2011 | Mumbauer et al. | 345/473 |
| 2011/0185309 | A1* | 7/2011 | Challinor | A63F 13/10 715/784 |
| 2011/0292034 | A1* | 12/2011 | Corazza et al. | 345/419 |
| 2011/0292055 | A1* | 12/2011 | Hodgins et al. | 345/473 |
| 2012/0019517 | A1* | 1/2012 | Corazza et al. | 345/419 |
| 2012/0092340 | A1* | 4/2012 | Sarnoff et al. | 345/420 |
| 2012/0194644 | A1* | 8/2012 | Newcombe et al. | 348/46 |
| 2013/0215264 | A1* | 8/2013 | Soatto et al. | 348/143 |
| 2013/0235045 | A1* | 9/2013 | Corazza et al. | 345/473 |
| 2014/0168073 | A1* | 6/2014 | Chizeck | G06F 3/016 345/156 |

OTHER PUBLICATIONS

Herda, et al., "Skeleton-Based Motion Capture for Robust Reconstruction of Human Motion", In Proceedings of the Computer Animation, May 3, 2000, 7 Pages.

"International Search Report & Written Opinion for PCT Patent Application No. PCT/US2013/052807", Mailed Date: Oct. 17, 2013, Filed Date: Jul. 31, 2013, 10 Pages.

* cited by examiner

ANIMATING OBJECTS USING THE HUMAN BODY

BACKGROUND

Computer animation is typically a very time consuming activity requiring computer graphics (CG) expertise and use of specialist software tools and considerable computing power. First a model of an object will be generated in the form of a 3D mesh. A CG animator will then generate and embed a skeleton inside the 3D mesh of the object being animated and paint individual bone weights onto each vertex. At runtime, motion capture data or an inverse kinematics engine drives the bones of the character, which then transforms the mesh. Depending upon the level of experience of the user and the complexity of the object being animated, this process may take hours or days.

The embodiments described below are not limited to implementations which solve any or all of the disadvantages of known methods of computer animation.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Methods of animating objects using the human body are described. In an embodiment, a deformation graph is generated from a mesh which describes the object. Tracked skeleton data is received which is generated from sensor data and the tracked skeleton is then embedded in the graph. Subsequent motion which is captured by the sensor result in motion of the tracked skeleton and this motion is used to define transformations on the deformation graph. The transformations are then applied to the mesh to generate an animation of the object which corresponds to the captured motion. In various examples, the mesh is generated by scanning an object and the deformation graph is generated using orientation-aware sampling such that nodes can be placed close together within the deformation graph where there are sharp corners or other features with high curvature in the object.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

As described above, CG animation is typically limited to experienced animators using specialist tools and hardware. In contrast, the methods and systems described below can be used by anyone (adults and children), including those with little or no CG experience, to create animations in 2D or 3D using consumer hardware (e.g. a PC or games console). The methods use the human body for input and enable rapid and intuitive generation of animated sequences. Furthermore, some of the methods described below are adapted to handle scenarios which are challenging even for specialist animation tools, such as non-humanoid meshes and incomplete surfaces produced by 3D scanning. The applications of the methods and systems described below include interactive storytelling, videoconferencing and gaming and further examples are described below.

Figure 1:
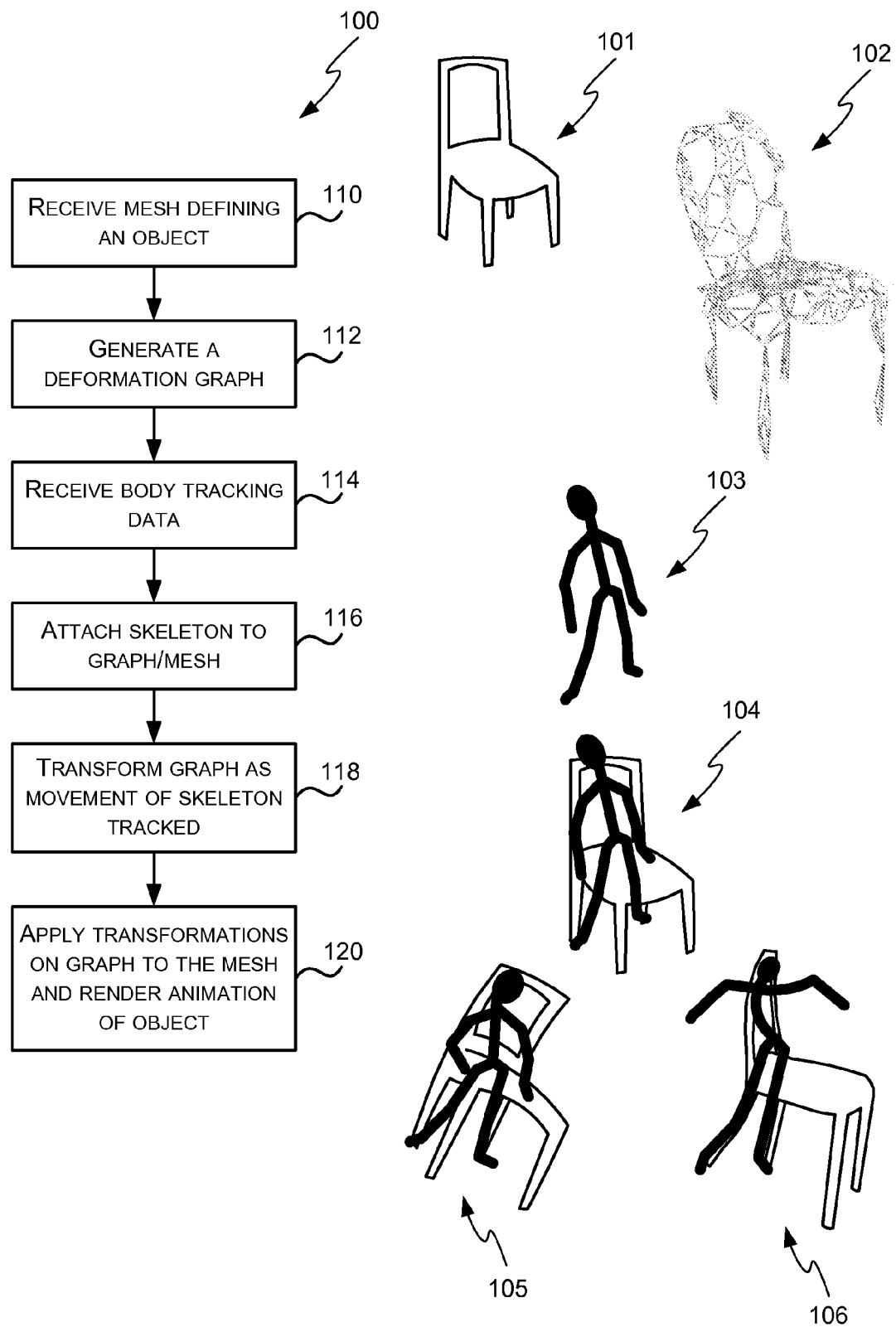
FIG. 1 shows a flow diagram of an example method of animating an object and a sequence of images which illustrate the method in action.

FIG. 1 shows a flow diagram 100 of an example method of animating an object. Alongside the flow diagram 100, FIG. 1 shows a sequence of images 101-106 which illustrate the method in action. The method receives as an input (in block 110) a mesh defining the object to be animated. This object may be referred to as the 'target' and may be in 2D or 3D. The mesh may be obtained in any way (e.g. by scanning the object) or from any source (e.g. downloaded off the internet). The mesh may be unstructured data (e.g. unstructured 3D data), for example, where the mesh is obtained by scanning in an object; however, the method works with any data including closed 3D models or geometrically complex off the shelf models. Image 101 shows an example target in the form of a chair. The input mesh is a static representation of the object which is to be animated.

A deformation graph is generated automatically from the input mesh (block 112) and this deformation graph is used as a proxy for the mesh of the object. The deformation graph is a deformable model of the object, comprising nodes and undirected edges. The nodes are arranged in a shape which approximately conforms to the shape of the object and the undirected edges connect nodes with local dependencies and provide a means for information exchange so that a globally consistent deformation can be found. Image 102 shows an example deformation graph. There are a number of ways in which this deformation graph may be generated (in block 112), for example, by traversing the vertices of the input mesh or by distributing nodes over the surface of the object and then repeatedly removing nodes within a given radius of a randomly chosen node until a desired sampling density is achieved. In some examples, the deformation graph may be the same as the input mesh, in which case, the generation of the deformation graph (in block 112) comprises passing the received input mesh to the next stage of the method.

As described above, the animation method uses the body of the user as an input and body tracking data for the user is acquired using a sensor and received from the sensor (in block 114). Any suitable sensor may be used, including but not limited to, non-contact sensors such as camera-based systems (e.g. Kinect™, Wii™) and marker-based tracking systems (e.g. using Vicon™ markers) and contact-based sensors such as a multi-touch device. The body tracking data defines positions of one or more points on a body and any type of body tracking data may be used which enables correspondences between the sensor data and nodes in the deformation graph to be determined. Examples include, but are not limited to, tracked human skeleton data (e.g. tracked patches or markers on the body) or use of a model-based tracking approach.

Image 103 shows an example tracked human skeleton which may be generated from or comprise the body tracking data. To enable the body of the user to be used as an input, this tracked skeleton (as defined by the body tracking data received in block 114) is attached to the deformation graph (block 116). As the deformation graph is a representation of the input mesh, the tracked skeleton may also be considered to be attached to the mesh. The attachment of the skeleton to the graph may be performed automatically without user input or in response to voice commands from the user, as is described in more detail below. A visual display may be provided to the user at this attachment stage so that they can position their body such that it approximates the shape of the object to be animated (e.g. such that their tracked skeleton approximately aligns with the object) and so the attachment of the skeleton to the graph is done in a more intuitive manner. Image 104 shows the overlapping of the skeleton 107 and the chair 108.

Once the tracked skeleton and the graph are connected, the deformation graph is transformed in real-time as movement of the skeleton is tracked (block 118). For example, as the user moves around in front of the sensor, the motion of the user will be tracked. This motion is then used to transform the deformation graph in a corresponding manner in real-time (i.e. as the user moves). The transformation of the deformation graph (in block 118) involves solving for the optimal transformations on the deformation graph that are smooth, feature-preserving and satisfy the user's motion constraints. This is described in more detail below.

Once the transformations have been computed on the deformation graph (in block 118), these transformations are applied to the input mesh and the corresponding motion (i.e. the animation) of the object is rendered for display to the user (block 120). Images 105 and 106 show two example images from an animation of the chair. The first image 105 shows the chair walking and the second image 106 shows the chair jumping. These images are generated, using the method described above, when the user walks and jumps respectively.

As described above, the attachment of the skeleton to the graph and subsequent transformation of both the graph and the mesh (blocks 114-120) are performed in real-time at runtime. The attachment of the skeleton to the graph is performed once, while the transformations (in blocks 118-120) are performed per frame (e.g. at a frame rate of 30 Hz). In contrast, although the deformation graph may be generated (in block 112) at runtime, alternatively this may be considered a pre-processing step and may be performed in advance. As described above, this pre-processing step (block 112) is entirely automatic.

Figure 2:
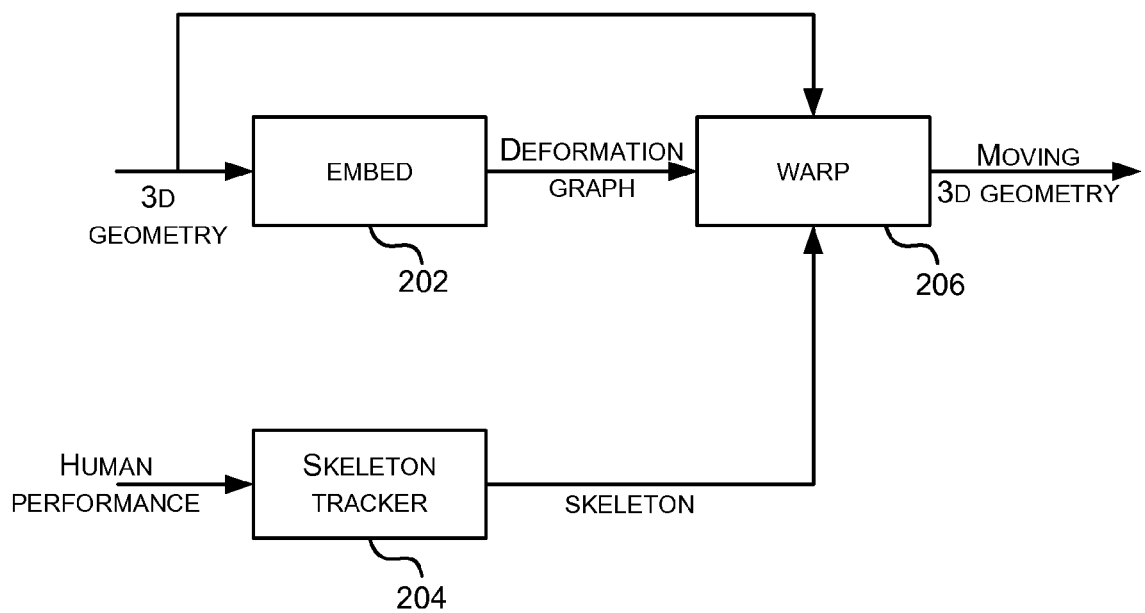
FIG. 2 shows an alternative representation of the flow diagram shown in FIG. 1.

FIG. 2 shows an alternative representation of the flow diagram shown in FIG. 1. In the example shown in FIG. 2, the method is divided into three blocks 202, 204, 206. The Embed stage (block 202) takes a 3D geometry as input (i.e. the input mesh) and generates the deformation graph (e.g. as in blocks 110-112 in FIG. 1). The Skeleton Tracker (block 204) detects human performance (e.g. the user standing still or motion of the user) and generates the body tracking (or skeleton) data. The Warp stage (block 206) takes the 3D geometry, body tracking data and the deformation graph as inputs, attaches the skeleton to the graph and then performs the transformations of both the deformation graph and 3D geometry based on the tracked changes in the body tracking data, i.e. the motion captured by the Skeleton Tracker (e.g. as in blocks 114-120 in FIG. 1).

Figure 3:
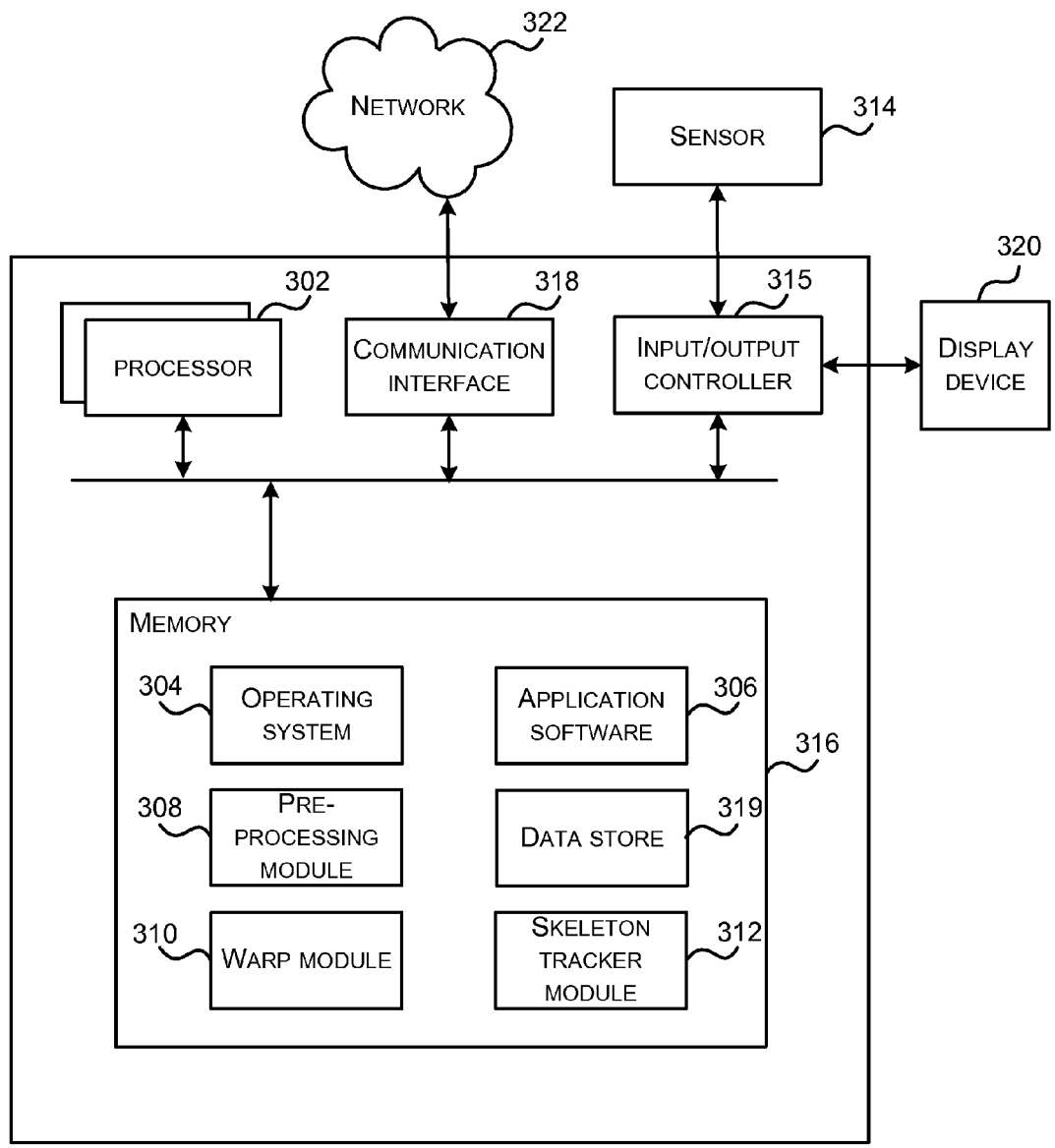
FIG. 3 illustrates an exemplary computing-based device in which embodiments of the methods described herein may be implemented.

The methods shown in FIGS. 1 and 2 and described above may be implemented using the system shown in FIG. 3. FIG. 3 illustrates various components of an exemplary computing-based device 300 which may be implemented as any form of a computing and/or electronic device, and in which embodiments of the methods described herein may be implemented. As described above, the computing-based device 300 may be a consumer computing-based device, such as a computer (e.g. desktop, laptop or tablet computer), games console or smart phone.

Computing-based device 300 comprises one or more processors 302 which may be microprocessors, controllers or any other suitable type of processors for processing computer executable instructions to control the operation of the device in order to perform the animation methods described herein. In an example, the computing-based device 300 may comprise at least one CPU and at least one GPU. In some examples, for example where a system on a chip architecture is used, the processors 302 may include one or more fixed function blocks (also referred to as accelerators) which implement a part of the method of animating objects in hardware (rather than software or firmware). Platform software comprising an operating system 304 or any other suitable platform software may be provided at the computing-based device to enable application software 306 to be executed on the device.

The computer executable instructions running on the computing-based device 300 (and which may be examples of application software) may include a pre-processing module 308, a warp module 310 and a skeleton tracker module 312. The pre-processing module 308 (which may correspond to the Embed stage, block 202 in FIG. 2) comprises computer executable instructions which, when executed, cause the processor to generate a deformation graph from an input mesh. The warp module 310 comprises computer executable instructions which, when executed, cause the processor to attach a skeleton to the graph and to transform the graph and the input mesh in response to motion of a tracked skeleton. The body tracking (or skeleton) data is provided to the warp module 310 by the skeleton tracker module 312 which processes data received from a sensor 314 (e.g. via input/output controller 315) to generate the body tracking data. Although FIG. 3 shows the skeleton tracker module 312 within the computing based device, in other examples, the skeleton tracker module 312 may form part of a separate sensor system which also comprises the sensor 314. In examples where the sensor 314 is a Kinect™ camera, the skeleton tracker module 312 may use the skeletal tracker in the Kinect™ SDK which gives a prediction of 20 joint positions on the human body (e.g. such that the body tracking data comprises these 20 predicted joint positions).

The computer executable instructions may be provided using any computer-readable media that is accessible by computing based device 300. Computer-readable media may include, for example, computer storage media such as memory 316 and communications media. Computer storage media, such as memory 316, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 316) is shown within the computing-based device 300 it will be appreciated that the storage may be distributed or located remotely and accessed via a network or other communication link (e.g. using communication interface 318).

The memory 316 may further comprise a data store 319 for storing data. Any type of data may be stored in the data store 319 and in an example, the data store 319 may be used to store one or more of: the input mesh (as received in block 110 of FIG. 1), body tracking data (as received in block 114 of FIG. 1), mappings or constraints which are created when attaching the skeleton to the deformation graph (e.g. in block 116 of FIG. 1) and transformations to the deformation graph (e.g. as calculated in block 118 of FIG. 1). The data store 319 may also be used to store the generated animations.

The input/output controller 315 receives data from the sensor 314 (or sensing system which comprises sensor 314) which may be external to the computing-based device 300 or may be integrated within the device 300. The sensor 314 may use any suitable technology and may, for example, comprise a camera. The input/output controller is also arranged to output display information to a display device 320 which may be separate from or integral to the computing-based device 300. The display information may provide a graphical user interface and is used to display the animation which is generated by the methods described herein and to display any graphical user interface which is used to assist the user in aligning their body to the object (as displayed) or otherwise to assist in the attaching of the skeleton to the object which is being animated.

The sensor 314 operates as a user input device and as described above, may form part of a sensing system. This sensing system may comprise multiple sensors 314. The input/output controller 315, which receives data from the sensor(s) 314 may be arranged to receive and process input from one or more additional devices, which may include one or more additional user input devices (e.g. a mouse, keyboard, camera, microphone or other sensor). The sensor 314 is arranged to detect user gestures or other user actions and provides a natural user interface (NUI). In some examples the sensor 314 or other user input device may detect voice input (e.g. to influence or trigger the attachment of the skeleton to the graph). In an embodiment the display device 320 may also act as the user input device if it is a touch sensitive display device. The input/output controller 315 may also output data to devices other than those shown in FIG. 3, e.g. a locally connected printing device, a second display device, etc.

As described above, the sensor 314, input/output controller 315, display device 320 and optionally any other user input device may comprise NUI technology which enables a user to interact with the computing-based device in a natural manner, free from artificial constraints imposed by input devices such as mice, keyboards, remote controls and the like. Examples of NUI technology that may be provided include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that may be used include intention and goal understanding systems, motion gesture detection systems using depth cameras (such as stereoscopic camera systems, infrared camera systems, RGB camera systems and combinations of these), motion gesture detection using accelerometers/gyroscopes, facial recognition, 3D displays, head, eye and gaze tracking, immersive augmented reality and virtual reality systems and technologies for sensing brain activity using electric field sensing electrodes (EEG and related methods).

The communication interface 318 may be used to access remote storage, to receive an input mesh and/or for any form of communication via a network 322. In some examples, the sensor 314 may be located remotely from the computing-based device 300 which is performing the animation method, in which case the computing-based device 300 may communicate with the sensor 314 via the communication interface 318 instead of via the input/output controller 315. In an example scenario, the computing-based device 300 may be a cloud-based server with the sensor 314 and display device 320 located in the same place as the user. In this scenario, the computing-based device 300 will communicate with both the sensor 314 and the display device 320 via the communication interface 318 instead of via the input/output controller 315.

Although the methods of animation described herein are shown in FIG. 3 as being implemented using software modules 308-312, alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs).

The following paragraphs describe each of the blocks of the flow diagram shown in FIG. 1 in more detail and provide various examples, variations and alternative implementations which may be used. It will be appreciated that aspects described with respect to one block may be combined in any way with aspects described with respect to any other blocks in the method.

The input mesh, which is received in block 110 of FIG. 1, comprises data (e.g. 3D unstructured data) which may be generated or obtained in any way. In various examples, the input mesh may be downloaded from the internet or may be generated by scanning the object (e.g. using the same sensor 314 which is also used in tracking the user's motion). The methods described herein can use arbitrary meshes, and these meshes need not be complete and may be polygon soups (including incomplete polygon soups), triangle meshes, point clouds, volumetric data, watertight 3D models, etc. In various examples, the input mesh may be generated from a real-world non-human (e.g. inanimate) object of reasonable physical size and surface reflectance.

In an example, the input mesh may be generated using a technique known as KinectFusion and described in 'KinectFusion: Real-time 3D reconstruction and interaction using a moving depth camera' by Izadi et al and published in UIST 2011. This technique uses a Kinect™ camera as the sensor and may be described with reference to FIG. 4, which shows a flow diagram 400 of an example method of generating an input mesh. The Kinect™ camera uses a structured light technique to generate real-time depth maps containing discrete range measurements of the physical scene. This data can be reprojected as a set of discrete 3D points (or point cloud). It will be appreciated that in other examples, alternative depth cameras may be used.

Figure 4:
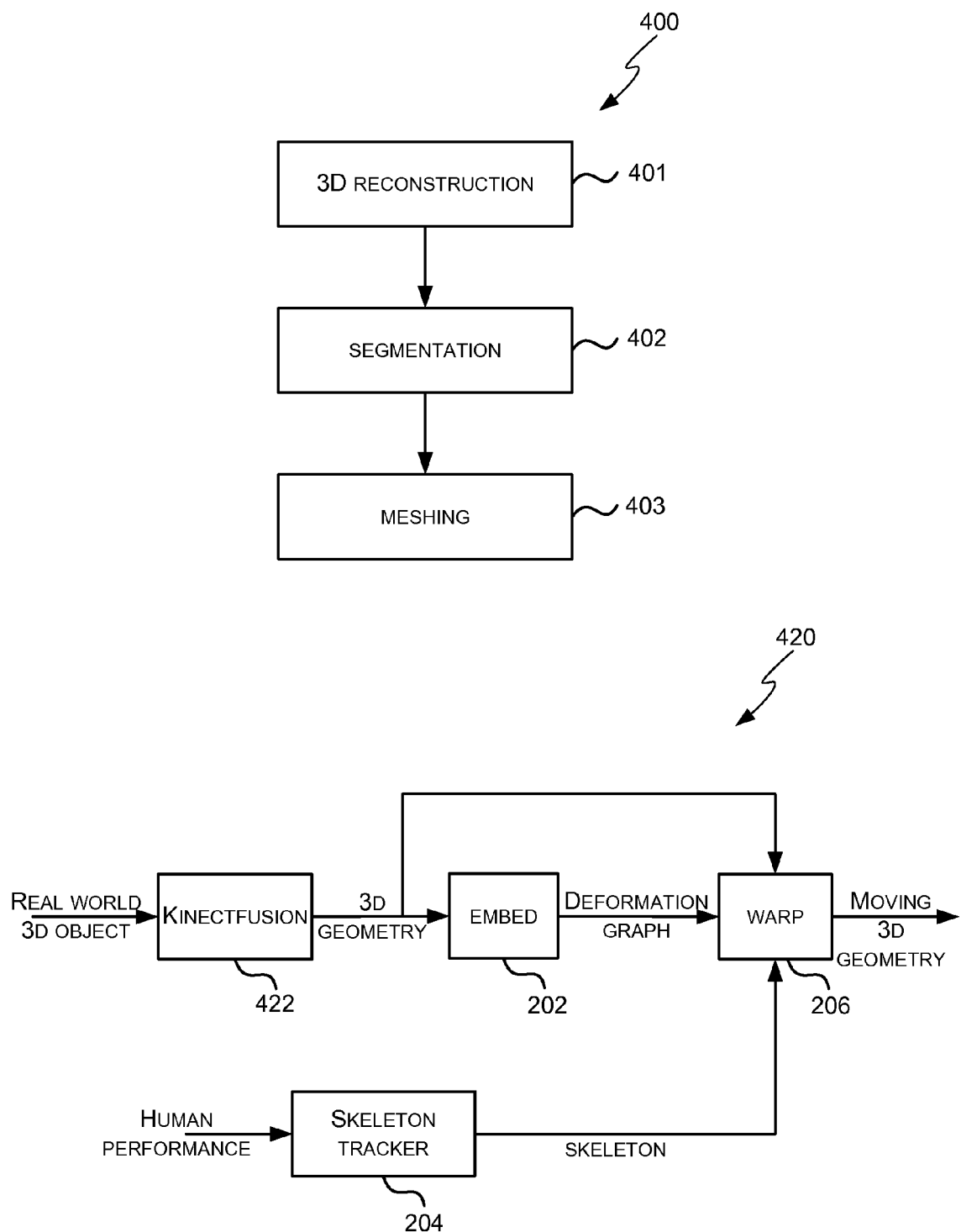
FIG. 4 is a flow diagram of an example method of generating an input mesh and a flow diagram of another example method of animating an object.

As shown in the first flow diagram 400 in FIG. 4, this example method of generating an input mesh, comprises three stages (blocks 401-403). The 3D reconstruction stage (block 401) estimates the 6-DoF (Degree of Freedom) pose of the moving Kinect™ camera while the user scans the object with the camera, and fuses depth data continuously into a regular 3D voxel grid data structure which may be stored on a GPU. Surface data is encoded implicitly into voxels as signed distances, truncated to a predefined region around the surface, with new values integrated using a weighted running average. The global pose of the moving depth camera is predicted using point-plane ICP (Iterative Closest Point), and drift is mitigated by aligning the current raw depth map with the accumulated model (instead of the previous raw frame). The system produces a 3D volumetric reconstruction of the scene accumulated from the moving depth camera. It will be appreciated that alternatively, the depth camera may remain static and the user may move the object in front of the camera to create the 3D volumetric reconstruction. It is not necessary for the scan to be complete (e.g. covering all sides of the object) because the methods described herein can accommodate input meshes which are incomplete scans (e.g. where one or more sides of the image are missing).

The 3D reconstruction which is generated (in block 401) is, in many examples, of the whole scene (e.g. the object which is to be animated, objects around it and the background). The second stage of this example method of generating an input mesh involves segmenting the object of interest from the scene (block 402). To extract a specific object from the full 3D reconstruction (generated in block 401), any suitable segmentation method may be used and two examples are described below. In examples where the 3D reconstruction only comprises the object itself, the segmentation stage (block 402) may be omitted.

The first segmentation method, which is described in the KinectFusion paper referenced above, relies on the user physically removing the desired object from the reconstructed scene (e.g. the user picks up the chair and moves it out of view of the Kinect™ camera). Taking the derivative of the signed distance values over time, regions of the voxel grid with high change are labeled. A full pass over the voxel grid extracts these labeled connected components and the largest region is chosen as the foreground object. This method works well for objects that are physically small enough to be moved (e.g. a chair); however, for larger objects, the second example segmentation method may be more suitable. This second example method takes the current physical camera pose, raycasts the voxel grid and extracts the dominant plane using RANSAC (Random Sample Consensus), segmenting any resting objects (again the largest 3D connected component is assumed to be the desired object).

The meshing stage (block 403) automatically extracts and triangulates the desired foreground isosurface stored implicitly in the voxel grid. A geometric isosurface is extracted from the foreground labeled volumetric dataset using a GPU-based marching cubes algorithm. For each voxel, the signed distance value at its eight corners is computed. The algorithm uses these computed signed distances as a lookup to produce the correct polygon at the specific voxel.

Where KinectFusion techniques are used to generate the input mesh, the flow diagram of FIG. 2 may be extended as shown in the second flow diagram 420 in FIG. 4. The KinectFusion stage 422 generates the 3D geometry from the real-world 3D object and outputs the 3D geometry to both the Embed stage 202 and the Warp stage, block 206. In this example, a Kinect™ camera (e.g. the same Kinect™ camera) may be used both in the generation of the 3D geometry (in the KinectFusion stage 422) and in skeleton tracking (in the Skeleton Tracker, block 204). Alternatively, where a different depth camera is used, this camera may be used both in the generation of the 3D geometry and in tracking the motion of the user.

As described above, there are a number of ways in which the deformation graph may be generated (in block 112), for example, by traversing the vertices of the input mesh or by distributing nodes over the surface of the object and then repeatedly removing nodes within a given radius of a randomly chosen node until the desired sampling density is achieved. Depending on the sampling density used, the deformation graph may be considered a sparse deformation graph (e.g. it may contain a reduced number of nodes) and use of a sparse graph reduces the computational complexity and has the effect that the method runs more quickly on consumer hardware. An example method of generating a deformation graph can be described with reference to FIG. 5. This method is an extension of a technique described in 'Embedded deformation for shape manipulation' by Sumner, Schmid, and Pauly in SIGGRAPH 2007.

Figure 5:
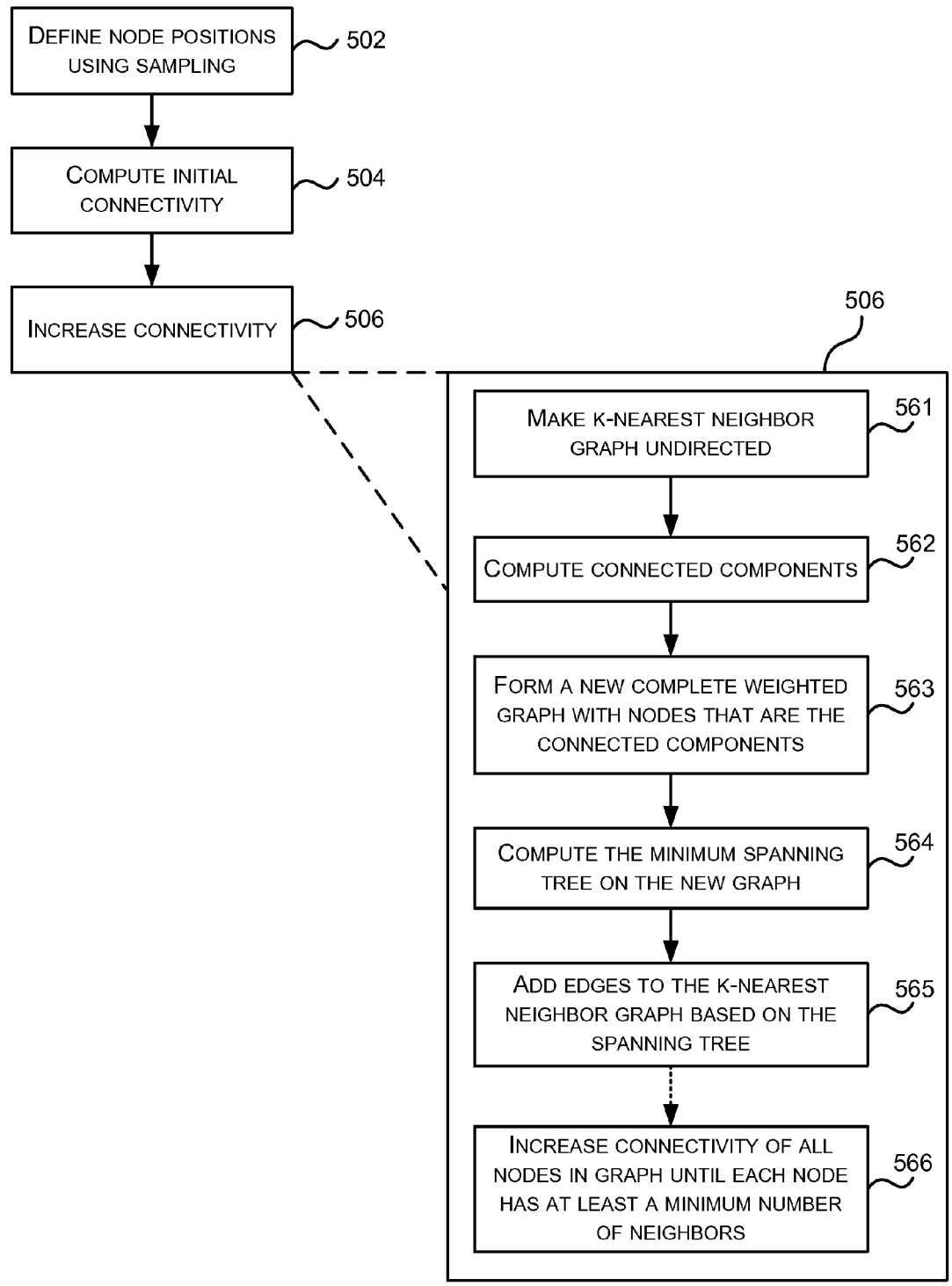
FIG. 5 is a flow diagram of an example method of generating a deformation graph.

As shown in FIG. 5, the node (or vertex) positions within the deformation graph are defined initially using sampling (block 502). These node positions may defined by traversing the vertices of the input mesh or by distributing nodes over the surface of the object and then using Poisson Disk sampling (which may also be referred to as Poisson Disk pattern generation). Where nodes are defined by traversing the vertices of the input mesh, the method involves selecting a region of surface (e.g. selecting a triangle and then a point inside the triangle), picking a radius based on the total area of surface and using dart throwing until a desired number of samples is reached. Poisson Disk sampling is a technique in which a node is selected at random and then all nodes within a defined radius of the selected node are removed. This process is then repeated many times until a desired sampling density is achieved. The distance metric which is used in performing the Poisson Disk sampling may be a Euclidean distance metric; however, this can miss areas of the surface with high curvature and result in artifacts where semantically unrelated parts are linked. Consequently, an alternative distance metric may be used in sampling: a 5D orientation-aware distance metric. Where this metric is used, the sampling may be referred to as 'orientation-aware sampling'.

Given surface samples p and q with normals $\vec{n}_p$ and $\vec{n}_q$, a 5D orientation-aware distance D(p,q) may be defined as:

$$D(p, q) = \min(dist_q(p), dist_p(q)) \quad (1)$$

or $$D(p, q) = \frac{\min(dist_q(p), dist_p(q))}{\max(0, \vec{n}_p \cdot \vec{n}_p)}$$

where:

$$dist_q(p) = \|p - q + 2((p-q) \cdot \vec{n}_q)\vec{n}_q\|$$

$$dist_p(q) = \|q - p + 2((q-p) \cdot \vec{n}_p)\vec{n}_p\|$$

The Mahalanobis distance $dist_q(p)$ transforms the spherical isosurfaces around q defined by the Euclidean distance into ellipsoids with the $\vec{n}_q$ axis squashed by a factor of ⅓. It increases the distance of points that deviate from the plane tangent to q. The distance D(p,q) has the property that distances increase faster when their normals deviate from alignment. When used for Poisson Disk pattern generation, it allows differently oriented samples to be placed arbitrarily close together.

A Poisson Disk pattern is generated (in block 502) as the node positions of the deformation graph using the distance metric defined in equation (1) above. Since a fixed framerate is generally used, a fixed number of samples N may be used and the minimum separation radius, R, may be defined as R= √A/N, where A is the total surface area of the input mesh. In an example implementation, N=128. Alternatively, R may be defined by a desired level of detail and the number of samples N may be varied. Actual generation may be performed by brute force dart throwing (e.g. by repeatedly picking a random point on the surface, checking the point's distance to existing samples, and rejecting if it falls within a radius of existing samples). As part of the process of defining node positions (in block 502), the surface normal for each node may be stored as part of the graph node for later use in detecting how to attach a user's skeleton to the graph (as described in more detail below).

Having generated the node patterns (in block 502), the initial connectivity is computed by defining k-nearest neighbor edges (in block 504) defined using the same 5D orientation-aware distance metric as defined in equation (1) above.

The k-nearest neighbor graph, as computed in block 502, is not necessarily connected because a lack of scan data or insufficient sampling can lead to a graph composed of several connected components. This can lead to errors when computing transformations (e.g. in block 118 of FIG. 1). To address this, additional edges may be added to increase the connectivity of the deformation graph (block 506). As described in more detail below, these additional edges are added (in block 506) based on analysis of connected components in the nearest neighbor graph.

To increase the connectivity of the original k-nearest neighbor graph G=(V,E), as output by block 504, the graph is first made undirected (block 561), such that if B is a neighbor of A, A is also a neighbor of B. The connected components of the undirected k-nearest neighbor graph are then computed (block 562) and a new complete, weighted graph G'=(V',E'), is formed (block 563), whose nodes V' are the connected components of G, and every pair of nodes (u',v') has weight equal to the minimum distance between any two nodes s∈u'⊂V and t∈v'⊂V. The distance metric used in determining the minimum distance may be the 5D orientation-aware distance metric, as defined in equation (1) above. A minimum spanning tree is then computed on G' (block 564) and an (undirected) edge (s,t) is added to E (i.e. to the set of edges in the k-nearest neighbor graph, G) if there is an edge between their connected components in the spanning tree (block 565).

In some examples, the connectivity may be further increased (in block 506) such that each node in the graph G has at least a minimum number of neighbors (block 566). In an example implementation, the minimum number of neighbors may be set at four.

In examples where additional links are added (e.g. in block 565 and/or block 566), data defining these additional edges may be stored separately (e.g. in a table of special links) or these new edges may be tagged or otherwise identifiable in some way, as in some examples these new edges are treated differently when calculating transformations on the deformation graph (as described in more detail below).

At runtime, body tracking data is received and attached to the deformation graph (blocks 114-116 in FIG. 1). The body tracking data may be obtained using any suitable sensor or sensor system (e.g. sensor 314 in combination with the skeleton tracker module 312 in FIG. 3) and where a sensor is used in generating the input mesh, the same sensor may, in some examples, be used to track the motion of the user.

When attaching the tracked skeleton to the deformation graph (in block 116), this may be performed automatically by adding point constraints in space. For example, each joint in the tracked skeleton (or each point in the body tracking data) may be made a constraint. In such an example, at attachment time, the position of each joint $p_i$ (or other point, where joints are not used) is stored along with Euclidean distances to the k-nearest nodes in the deformation graph. As the user moves, each joint (or point) moves to a new position $q_i$ and the graph is transformed such that the k-nearest nodes map $p_i \rightarrow q_i$.

Figure 6:
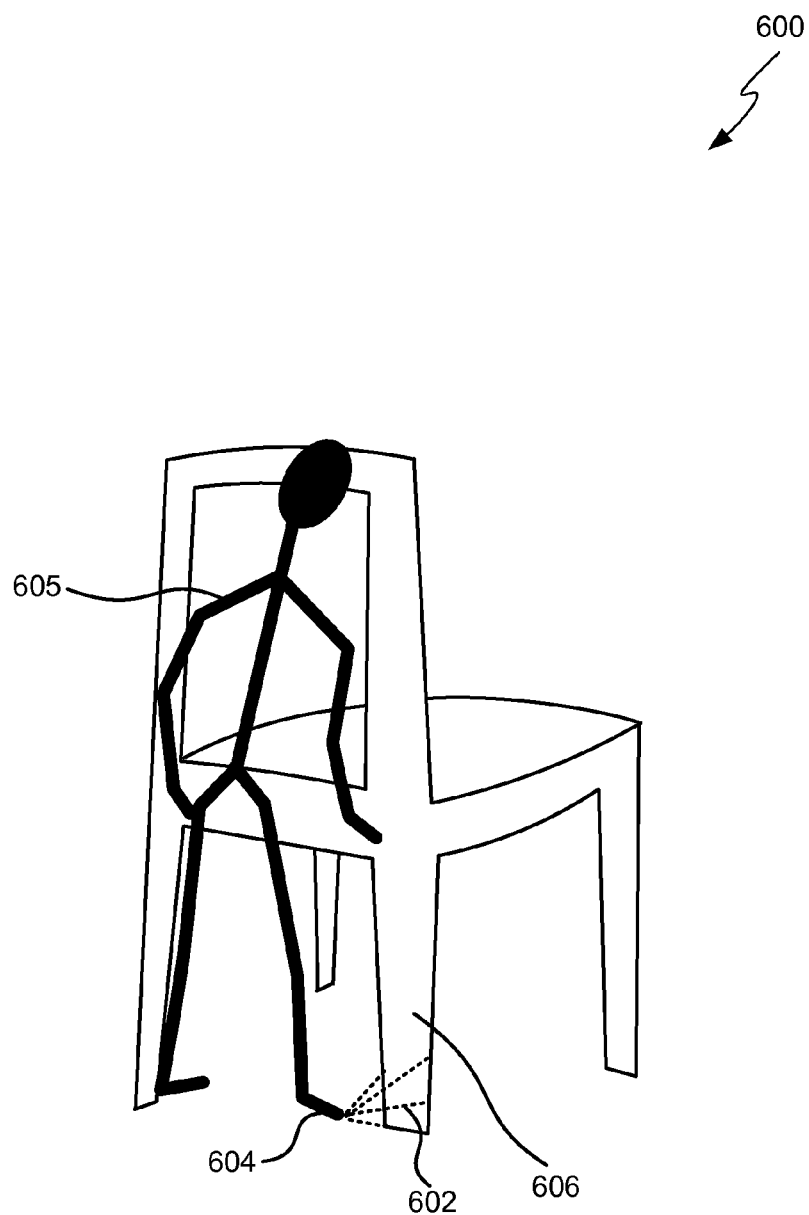
FIG. 6 is a schematic diagram of a graphical user interface showing proposed links between an object and a tracked skeleton.

In various examples, which nodes in the graph are linked to each joint (e.g. through the point constraints described above) will depend on the position of the user when the tracked skeleton is obtained. As the user has freedom to adopt different body positions, the user can influence or directly control which parts of their body are mapped to particular parts of the object being animated. In order to assist the user in this, a graphical user interface (GUI) may be provided which provides visual feedback to the user, for example by displaying both the tracked skeleton and the object (or more particularly, the mesh of the object). Various presentation techniques may be used to make this GUI clearer or more intuitive, for example, by making the object partially transparent and/or showing the tracked skeleton in a bright color and/or by displaying skeleton overlaid over the object (or vice-versa). In some examples, the GUI is arranged such that the user appears to walk up to the object within the GUI. In some examples, lines or links 602 may be shown in the GUI 600 between a joint 604 on the skeleton 605 and the k-nearest nodes in the graph representing the object mesh 606 as shown in FIG. 6. The links 602 may be displayed dynamically as the user moves towards the object 606 within the scene displayed in the GUI 600. As the user moves, and their skeleton is tracked, the links may be updated (as the k-nearest nodes change) to enable the user to control the mapping between joints and nodes.

Figure 7:
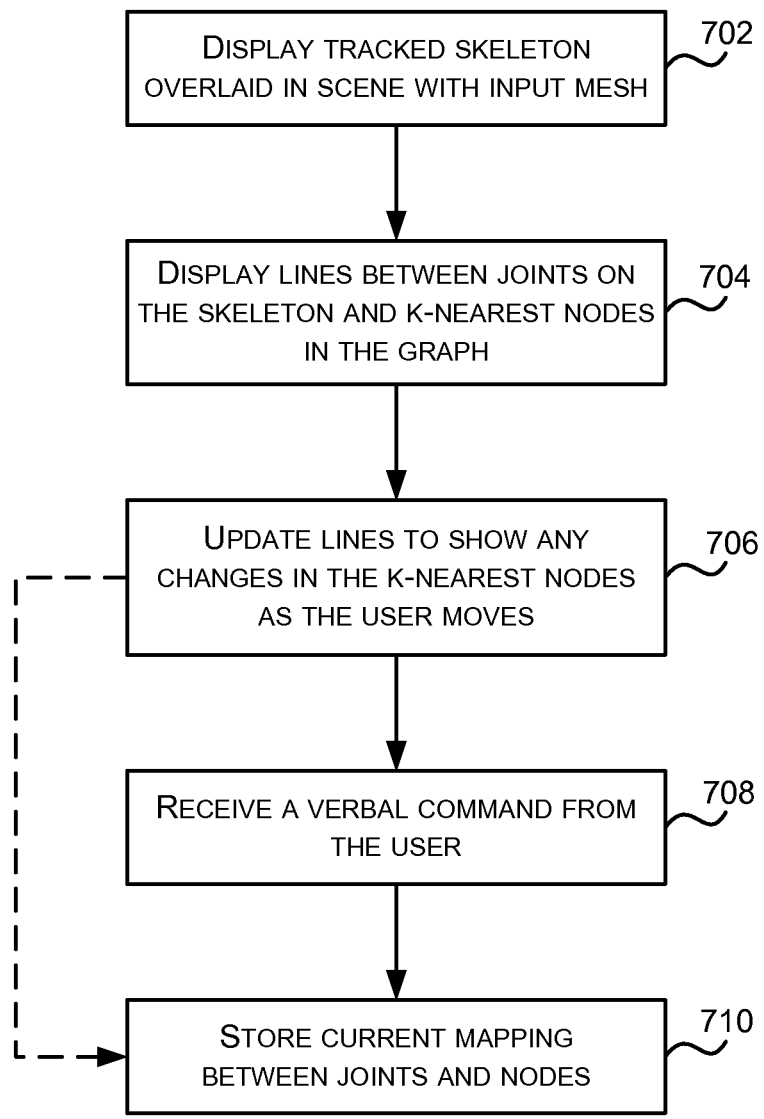
FIG. 7 shows a flow diagram of an example method of attaching the skeleton to the deformation graph.

FIG. 7 shows a flow diagram of an example method of attaching the skeleton to the deformation graph in which the user poses themself such that their body intersects with the input mesh of the object. As described above, the tracked skeleton (e.g. as generated using the data received in block 114 of FIG. 1) is displayed at the same time as the input mesh (block 702). Initially the two may not be displayed overlaid to allow the user to appear (in the GUI) to walk into the scene and towards the object being animated. Once the skeleton and object are close together, they are at least partially overlaid. Lines are displayed between joints on the skeleton and the k-nearest nodes in the deformation graph (block 704). At this stage, the mapping between joints and nodes has not been confirmed and so these lines represent a proposed mapping rather than a confirmed (or actual) mapping that will be used in subsequent animation. As shown in FIG. 6, the GUI comprises multiple lines (e.g. k lines) radiating from each joint in the skeleton to points on the object mesh which correspond to the nodes in the deformation graph. In some examples, to improve clarity of the GUI, fewer than k lines may be displayed. As described above, the k-nearest nodes (i.e. the proposed mapping) may be determined dynamically, such that as the user moves, the k-nearest nodes may change and so the lines displayed in the GUI (and the proposed mapping) may be updated (block 706).

In various examples, the mapping may be confirmed (in block 710) in response to a verbal command received from the user (block 708) and on confirming the mapping, the current proposed mapping is stored (in block 710) as the actual mapping between joints and nodes, for use in subsequent stages of the animation method. The user may give the command (e.g. "possess") when they are happy with the linking between joints and parts of the object. Through use of a verbal command, the user does not need to move any of their limbs, the position of which are being tracked, and so the issuance of the command will not affect the resultant confirmed mapping. Where a verbal command is used, this may be detected by a sensor system which is also imaging the user to enable skeleton tracking (e.g. a sensor system comprising both a camera and a microphone). In other examples, other types of commands may be used or the mapping may be performed automatically (e.g. block 708 omitted) when the user remains still, such that the tracked skeleton does not change position, and hence the proposed mapping does not change, for a defined period of time (e.g. 2 seconds). Where the attachment is performed automatically, the user is still in the loop because the position of their tracked skeleton affects the way the attachment is done (i.e. which parts of the skeleton attach to which parts of the deformation graph).

Although the description of the GUI above refers to the display of the tracked skeleton overlaid with the object, in other examples, captured images of the user's body may be used instead of the tracked skeleton. In some examples, the deformation graph may be displayed instead of the input mesh. It will also be appreciated that the visual feedback may be provided in different ways or other types of feedback may be used (e.g. audible feedback). Where visual feedback is used it may visually embed parts of the user into an object represented by an unstructured mesh (the input mesh).

In a variation of the methods of attaching the tracked skeleton to the deformation graph, constraints may be placed on bones in addition to (or instead of) attaching joints as point constraints. This makes reproduction (e.g. animation) of complex user motions more accurate and more realistic to the viewer and improves the accuracy of the attachment in cases where the user is not very good at judging whether they are intersecting accurately with the mesh and as a result the user places their limbs outside the surface of the object.

In this variation, each bone of a tracked skeleton is modeled as a cylinder with a predefined radius (e.g. 4 cm) or other 3D shape. A number of samples are placed along the length and circumference of each bone at a regular spacing (e.g. 16 samples per bone) and the outward facing normal of the bone at each sample position is calculated. When attachment is triggered (e.g. as a result of receiving a verbal command in block 708 of FIG. 7 or based on other criteria), a bone sample is attached to a graph node only if they a separated by less than a defined (Euclidean) distance (e.g. 10 cm) and the outward facing normals of the bone sample and the graph node are less than 90° apart.

Using this variation, there are now many more samples on each limb (there were only two where just the joints were used) which assists in making the animation match the user motion more accurately for longer bones. Furthermore, using normals makes the system and method robust to small misalignments between the user and the surface. For example, if the user is animating another scanned human, her arms may not be perfectly aligned with those of the scan. The surface normal test lets the front of her arm attach to the front of the arm in the scan, and likewise for the back. It has been shown that this works well with one-sided surfaces that come from the KinectFusion system described above.

Referring back to FIG. 7, implementation of this variation may only affect the actual mappings that are stored (in block 710) rather than displaying lines for all the additional sample points (in blocks 704-706).

Having attached the skeleton to the deformation graph (in block 116), when the tracked skeleton moves, as a result of the user moving, the deformation graph is transformed (in block 118). The transformations are determined by solving a non-linear energy minimization problem for each frame in real-time. This identifies the optimal transformations on the deformation graph that are smooth and feature-preserving and which satisfy the user's motion constraints. As the calculations are performed in real-time, this may be described as a dynamic operation.

The Embedded Deformation technique (as originally described in the Sumner paper referenced above and extended herein) assumes that the set of shape deformations varies smoothly in space and can be expressed as linear combinations of a sparse set of affine transformations. Each node in the deformation graph deforms space in a region surrounding its position $g_j$ with an affine transformation $A_j=(R_j, t_j)$, where R is a 3×3 matrix and t is a 3×1 vector. This affine transform maps the point v to:

$$A_j[v]=R_j(v-g_j)+g_j+t_j$$

The deformation defined by multiple nodes is combined linearly as in linear blend skinning (LBS). Given a point $v \in \Re^3$, the deformation graph maps it to:

$$\phi(v) = \sum_{j=0}^{k-1} w_j(v) A_j[v] \quad (2)$$

Figure 8:
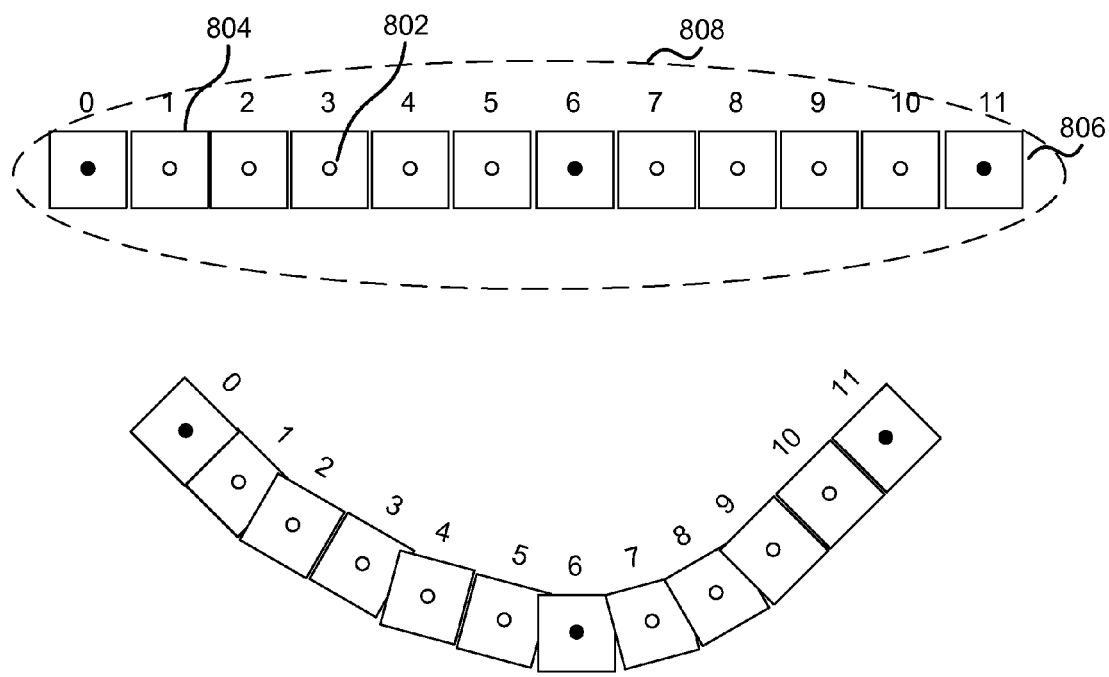
FIG. 8 is a schematic diagram showing an example transformation applied to a series of nodes.

The blending weights $w_j(v)$ are nonzero only for the k nodes closest to v, fall off linearly with distance, and sum to one. If transformations defined by the nodes vary smoothly, and the nodes are of sufficient density, then the vertices also deform smoothly. Using this technique, features rotate during deformation rather than stretch or shear, as shown in FIG. 8. FIG. 8 is a schematic diagram showing 12 nodes 802 (numbered 0-11) and the space surrounding each node is shown as a square 804. Initially, the nodes are shown in a straight line 806 but if the solid nodes (nodes 0, 6 and 11) are attached to the skeleton and node 6 is moved down, it can be seen that the other unattached nodes (nodes 1-5 and 7-10) move smoothly and the surrounding space is deformed naturally, rotating without stretching. The transformation shown bends the nodes like an arm at an elbow. In 3D, the ellipse 808 would be the surface of the target object and the solid nodes (nodes 0, 6, 11) would correspond to a tracked skeleton.

To constrain the space of transformations, a number of assumptions are made and formulated as an energy minimization problem. The energy is defined as a weighted sum of four terms: a first term, $E_{rot}$, which minimizes stretching by biasing the solution towards isometry, a second term, $E_{reg}$, which is a regularization term that ensures that each node maps its neighbors near where they would map themselves, a third term, $E_{con}$, which incorporates the point constraints which are used to attach the deformation graph and the skeleton (as described above) and a fourth term, $E_{rig}$, which is referred to as the 'rigidity regularizer'. The energy is therefore given by:

$$E = w_{rot}E_{rot} + w_{reg}E_{reg} + w_{con}E_{con} + w_{rig}E_{rig}$$

Each of these terms, which are all quadratic terms, and their associated weights are described in more detail below. The energy minimization may be performed using the Gauss-Newton algorithm or any other suitable technique.

The first term, $E_{rot}$, which minimizes stretching may be defined as:

$$E_{rot} = \sum_j \|R_j^T R_j - I\|_F^2$$

where I is the identity matrix and $\|\cdot\|_F$ denotes the Frobenius norm. The associated weight, $w_{rot}$, may be set equal to one.

The second term, $E_{reg}$, is a regularization term ensures that each node maps its neighbors near where they would map themselves and hence ensures that the deformation field is smooth. This term may be defined as:

$$E_{reg} = \sum_j \sum_{k \in N(j)} \|A_j[g_k] - A_k[g_k]\|_2^2$$

where $N(j)$ is the set of neighbors of j in the graph. The associated weight, $w_{reg}$, may be set equal to 10.

The third term, $E_{con}$, incorporates an arbitrary number of point constraints which are defined when the tracked skeleton is attached to the deformation graph (as described above). Each constraint maps a given point $p_l$ to a desired target $q_l$ and the term may be defined as:

$$E_{con} = \sum_l \|\phi(p_l) - q_l\|_2^2$$

where $\phi(p_l)$ is the result of applying the deformation to $p_l$ (as set out in equation 2 above). The associated weight, $W_{con}$, may be set equal to 100.

The fourth term, $E_{rig}$, is the rigidity regularizer which may be included to ensure a stable deformation. The second term, $E_{reg}$, as described above is a regularization term, while the fourth term, $E_{rig}$, enforces a stronger regularization condition on a subset of the edges in the deformation graph. Without this fourth term, the energy function contains a number of gauge freedoms due to symmetry: a subgraph without user constraints, weakly connected to the rest of the graph through a single cut vertex (a vertex whose removal increases the number of connected components), is free to rotate about that point. These cut vertices include the ones where additional edges were added when the deformation graph was created (e.g. in block 565 of FIG. 5), as described above. Therefore, at these edges (i.e. at all cut vertices in the deformation graph) a stronger regularization condition is enforced and this may be defined as:

$$E_{rig} = \sum_{(j,k)} \|R_k^T R_j - I\|_F^2 + \|t_k - t_j\|_2^2$$

This fourth term says that if a piece of the mesh is only loosely connected, the bridge edge (j,k) encourages it to be coupled rigidly with the rest of the mesh. As this is a stronger condition than the basic regularizer (12 constraints rather than 3), a smaller weight is used, e.g. $w_{rig} = w_{reg}/10$.

Once the transformations on the deformation graph have been computed (e.g. using energy minimization methods, as described above), these transformations are applied to the input mesh using an algorithm similar to LBS.

Once an input mesh has been attached to a skeleton using the methods described above (a process which may be referred to as 'rigging' or 'possessing'), the input mesh may be incorporated into physics-enabled interactions. For example, such that one person can possess a friend's avatar and rampage through a physics-enabled world, knocking over towers of boxes, or a possessed chair or stepladder can be used to play dodgeball. These and more complex examples enable capture of the physical world in the digital domain, before bringing it to life, and enabling it to interact with other virtual objects in both physically plausible and implausible ways and in an example application, this may be used in new gaming scenarios.

To implement this in a physics simulation, the input mesh is approximated as a series of kinematic sphere proxies. Sphere packing may be performed as follows: repeatedly pick a random vertex (until all vertices are processed) on the mesh and place a sphere centered around it, pruning all neighboring vertices inside the sphere. The sphere radius may be set to four times the mesh's mean edge length.

Figure 9:
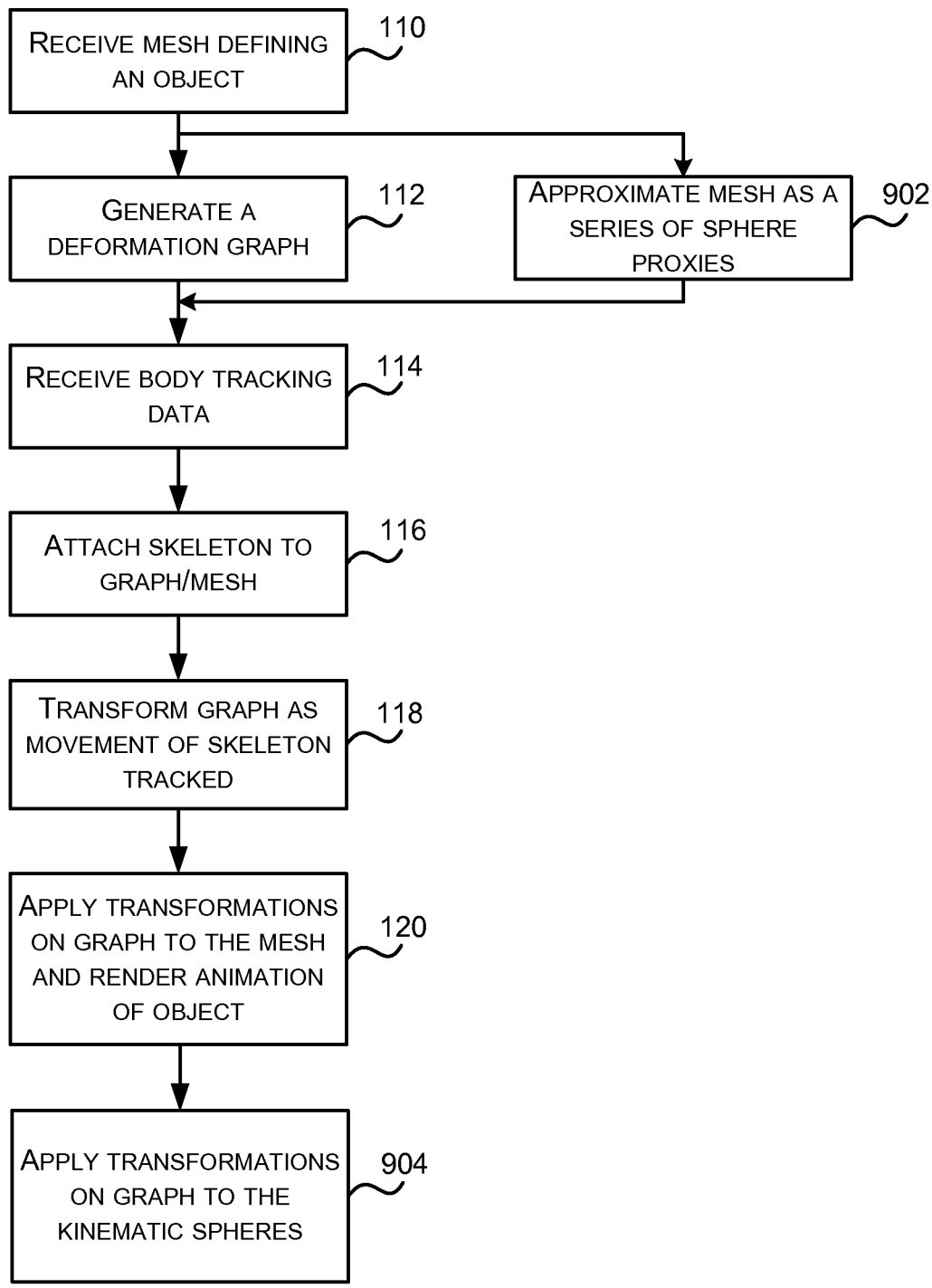
FIG. 9 shows a flow diagram of a further example method of animating an object.

As shown in FIG. 9, this approximation stage (block 902) may be done alongside the other stages in the pre-processing phase of the pipeline (e.g. alongside the generation of the deformation graph in block 112). For each frame, after deformations are computed on the graph, the kinematic spheres are moved accordingly (block 904), e.g. by applying the same transformations (as applied to the input mesh in block 120) to the sphere centers. Use of sphere proxies enables efficient modeling of collisions with other dynamic objects in the physical simulation.

Although many of the examples described above relate to 3D input meshes, the methods described herein may also be implemented using a 2D input mesh, for example, to animate 2D clip art. Use of a 2D input mesh reduces the computation complexity and so the methods may be implemented on hardware with less processing power and still run in real-time (e.g. on smart phones).

Figure 10:
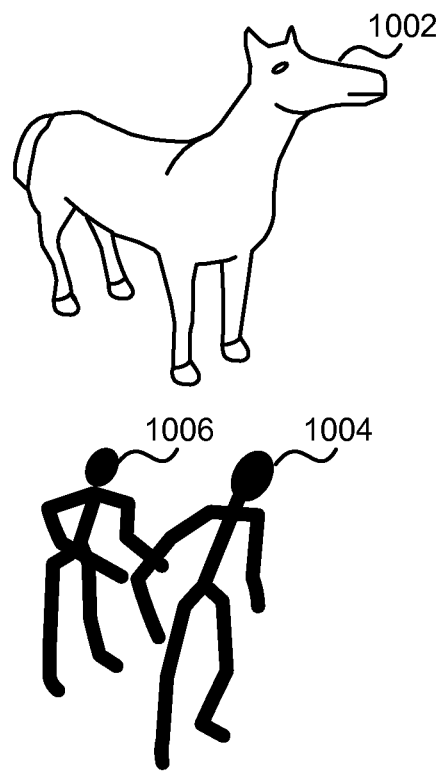
FIG. 10 shows a schematic diagram of multiple skeletons attached to a single object.

The examples described above involve attaching a single tracked skeleton to a deformation graph (in block 116 of FIG. 1). The methods may, however, be used to attach more than one tracked skeleton to an input mesh, as shown in the schematic diagram of FIG. 10. FIG. 10 shows an input mesh of a horse 1002 which may be attached to two tracked skeletons 1004, 1006 such that motion of the 'front' skeleton 1004 results in motion of the head and front legs of the horse and motion of the 'back' skeleton 1006 results in motion of the rear legs of the horse. In such an example, the attachment step (as described above), adds constraints associated with joints and/or bones from both skeletons but otherwise the method operates as described above.

Similarly, the tracked skeleton may be used to animate more than one object (e.g. a user's legs may be attached to a deformation graph of a chair and the same user's arms may be attached to a deformation graph of a desk lamp). Alternatively, only part of a user's body may be mapped to the deformation graph of an object (e.g. only a user's arms or only their fingers). Similarly, an entire skeleton may be used to animate only part of an object. Consequently, the attachment stage described above may be used to attach all or part of one or more skeletons to all or part of one or more deformation graphs. In some examples, the attachment process may occur in multiple phases, for example a first phase may be used to attach a first part of a skeleton to a first part of a deformation graph and a second phase may be used to attach a second part of a skeleton to a second part of a deformation graph and the user may be able to move in between phases (e.g. to better align themselves to the second part of the deformation graph). In such an example, commands (e.g. voice commands) may be used to control each phase and the progression from one phase to the next phase. It will therefore be appreciated that the methods described herein may be used to attach arbitrary parts of one or more skeletons to arbitrary parts of one or more deformation graphs in any manner which is desired by the user.

In the majority of the examples described above and in many applications, the objects being animated are non-humanoid objects where such objects may be inanimate objects (such as items of furniture or other household items) or animate objects (such as animals). In some examples, however, the objects being animated may be humans, such that, for example, one user can possess the avatar for another user. Furthermore, whilst the skeletons which are tracked and attached to the deformation graph are, in most examples, human skeletons, (i.e. the skeleton(s) of the user(s)), the methods are also applicable to scenarios where the tracked skeleton belongs to an animal and it is the animal skeleton that is attached to the deformation graph generated from the input mesh.

In some examples there may be a mismatch between the scale (e.g. height) of the tracked skeleton and the input mesh. In such instances, the height of the input mesh may be retargeted to match, at least approximately, the height of the tracked skeleton. Alternatively, the user may use gestures, once the tracked skeleton is embedded in the input mesh (through the attachment process), to manipulate the size or aspect ratio of the input mesh.

There are many example applications for the methods described above, including but not limited to generation of animated films (e.g. home CG movies), creation of more realistic avatars for gaming and teleconferencing scenarios (for example, an entire 360° reconstruction of a human body can be acquired, segmented from the ground plane and meshed using KinectFusion in less than one minute) and natural control of CAD models for simple assembly tasks. The methods may also be used for quickly previewing an animation before doing more sophisticated animation using a rigging or keyframe system.

In an example scenario which shows how the methods described herein may be used, a user wants to introduce and animate an existing static physical object, such as a chair, into a 3D game. He picks up a Kinect™ camera and scans in part of the room. The methods described herein automatically generate a 3D mesh of the chair and segment it from the background. At this point the user has a static, incomplete and un-rigged mesh in the CG world. To bring this object to life in realistic ways, the user first places the depth sensor back down so that it can image his full body, and a tracked human skeleton is sensed. The system described herein renders both the human skeleton and scanned object side by side. The user then physically moves such that the desired parts of the rendered skeleton are embedded inside the scanned object. Once in the desired pose, the user issues a voice command to automatically rig (or possess) the mesh. This attaches joints of his current pose to the mesh. The user can now move his body and the system described herein automatically translates his motion into realistic deformations of the previously static mesh. For example, moving his legs causes the legs of the chair to also move, flexing his knees causes the chair to bend, jumping up makes the chair also jump. Motions of the body propagate in real-time to the mesh and provides a natural way for users to perform playful animations of any object that they wish to bring to life in their CG application or game.

The methods described herein allow animation to be performed quickly by anyone (including novice users and young children) and do not require specialist hardware (consumer hardware can be used). Animation of diverse meshes is possible and the methods work for incomplete surfaces and meshes of any object (humanoid or non-humanoid). Use of the body as an input device provides more degrees of freedom than standard user input devices such as a mouse, keyboard or track pad. The entire pipeline from geometry acquisition to rigging and animation runs at interactive rates and requires no manual pre-processing by an artist.

The methods and apparatus described above provide a performance based approach to computer animation. Motion of the skeleton is tracked using a non-contact sensor and translated into motion of another object, which may be a non-humanoid object. Where the tracked skeleton is that of the user, the user's own body acts as a high DoF controller in controlling the motion of the animated object.

Although the present examples are described and illustrated herein as being implemented in a Kinect™-based system, the system described is provided as an example and not a limitation. As those skilled in the art will appreciate, the present examples are suitable for application in a variety of different types of systems using different sensors.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory etc and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A method of animating an object comprising:
generating, by a processor, a deformation graph automatically from an input mesh defining the object, the generation comprising:
defining a plurality of node positions using sampling;
creating a nearest neighbor graph by connecting each node to a number of nearest neighbor nodes; and
the sampling and the creating of the nearest neighbor graph both using an orientation-aware distance defined such that distances between a pair of samples increases faster when normals associated with each of the samples deviate from alignment;
receiving body tracking data defining positions of one or more points on a body;
attaching points on a skeleton to points on the deformation graph using the body tracking data;
transforming the deformation graph in real-time based on motion of the tracked skeleton by computing a plurality of transformations; and
dynamically applying the plurality of transformations to the mesh to render a corresponding animation of the object.

2. A method according to claim 1, further comprising creating the input mesh by:
generating a 3D volumetric reconstruction of a scene scanned by a user with a depth camera;
segmenting an object from the 3D volumetric reconstruction of the scene; and
extracting a geometric isosurface from the segmented portion of the 3D volumetric reconstruction.

3. A method according to claim 1, wherein attaching points on the skeleton to points on the deformation graph comprises attaching points on the deformation graph to points on the skeleton, the points on the skeleton being between joints of the skeleton.

4. A method according to claim 1, wherein generating a deformation graph automatically from an input mesh defining the object comprises:
defining a plurality of node positions using sampling;
creating a nearest neighbor graph by connecting each node to a number of nearest neighbor nodes; and
adding additional edges to the nearest neighbor graph based on analysis of connected components in the nearest neighbor graph.

5. A method according to claim 4, wherein the skeleton is an animal skeleton.

6. A method according to claim 4, wherein adding additional edges to the nearest neighbor graph based on analysis of connected components in the nearest neighbor graph comprises:
identifying any connected components in the nearest neighbor graph;
forming a weighted graph comprising nodes corresponding to each identified connected component and weights defined based on a minimum distance between the connected components in the nearest neighbor graph;
computing a minimum spanning tree on the weighted graph; and
adding an additional edge to the nearest neighbor graph where there is an edge between the connected components in the spanning tree.

7. A method according to claim 4, wherein transforming the deformation graph in real-time based on motion of the tracked skeleton by computing a plurality of transformations comprises treating the additional edges as links with greater rigidity than other connections between nodes in the nearest neighbor graph.

8. A method according to claim 1, wherein attaching points on a skeleton to points on the deformation graph comprises:
providing visual feedback to a user showing alignment of the tracked body and the input mesh;
dynamically generating a proposed mapping between points on a skeleton and a number of nearest nodes in the input mesh: and in response to a verbal command received from the user, storing the proposed mapping,
and wherein the stored mapping is used in dynamically applying the plurality of transformations to the mesh.

9. A method according to claim 1, wherein the object is non-humanoid.

10. A method according to claim 1, wherein the method is implemented interactively at run-time.

11. A method as claimed in claim 1 at least partially carried out using hardware logic.

12. A system comprising:
an input for receiving an input mesh defining an object;
a pre-processing module arranged to generate a deformation graph automatically from the input mesh and approximate the input mesh as a series of kinematic sphere proxies;
a warp module arranged to receive the deformation graph, the input mesh and body tracking data defining positions of one or more points on a body, to attach points on a skeleton to points on the deformation graph using the body tracking data, to compute a series of transformations on the deformation graph in real-time based on motion of the tracked skeleton, and to apply the series of transformations to the input mesh to generate an animation of the object; and
at least one of:
the pre-processing module further arranged to define a plurality of node positions using sampling and create a nearest neighbor graph by connecting each node to a number of nearest neighbor nodes, the sampling and the creating of the nearest neighbor graph both using an orientation-aware distance defined such that distances between a pair of samples increases faster when normals associated with each of the samples deviate from alignment;
the warp module further arranged to attach points on a skeleton to points on the deformation graph using the body tracking data, wherein the attachment comprises a plurality of phases wherein a first phase corresponds to at least one of a first set of points on the skeleton or a first set of points on the deformation graph and a second phase corresponds to at least one of a second set of points on the skeleton or a second set of points on the deformation graph; or
the pre-processing module further arranged to approximate the input mesh as a series of kinematic sphere proxies, wherein the approximation comprises placing at least one of the series of kinematic sphere proxies at at least one mesh vertex.

13. A system according to claim 12, further comprising:
a skeleton tracker module arranged receive data from a sensor and to generate the body tracking data from the received data.

14. A system according to claim 13, wherein the sensor is a depth camera.

15. A system according to claim 12, wherein the pre-processing module is arranged to generate the deformation graph using orientation-aware sampling.

16. A system according to claim 15, wherein the pre-processing module is further arranged to generate the deformation graph by defining a nearest neighbor graph from the input mesh using orientation-aware sampling and then adding additional edges to the nearest neighbor graph based on analysis of connected components in the nearest neighbor graph.

17. A system according to claim 16, wherein the warp module is arranged to treat the additional edges as more rigid than other edges in the deformation graph when computing the series of transformations on the deformation graph.

18. A system according to claim 12, further comprising:
a processor; and
a memory arranged to store the pre-processing module and the warp module,
and wherein the pre-processing module and warp module comprise processor-executable instructions.

19. A system as claimed in claim 12, wherein at least one of the pre-processing module and the warp module being at least partially implemented using hardware logic selected from any one or more of: a field-programmable gate array, a program-specific integrated circuit, a program-specific standard product, a system-on-a-chip, a complex programmable logic device.

20. One or more tangible device-readable media with device-executable instructions comprising:
device-executable instructions to generate a deformation graph automatically from an input mesh defining an inanimate object using orientation-aware sampling;
device-executable instructions to receive body tracking data relating to a user, the data defining positions of one or more points on the user's body;
device-executable instructions to attach points on a skeleton to points on the deformation graph using the body tracking data in response to a user command, the attachment comprising a plurality of phases wherein a first phase corresponds to at least one of a first set of points on the skeleton or a first set of points on the deformation graph and a second phase corresponds to at least one of a second set of points on the skeleton or a second set of points on the deformation graph;
device-executable instructions to transform the deformation graph interactively in real-time based on motion of the tracked skeleton by computing a plurality of transformations, the motion of the tracked skeleton corresponding to motion of the user; and device-executable instructions to dynamically apply the plurality of transformations to the mesh to render a corresponding animation of the object.

* * * * *